United States Patent
Schweitzer, III et al.

(10) Patent No.: US 11,108,737 B2
(45) Date of Patent: Aug. 31, 2021

(54) SECURE ELECTRIC POWER DELIVERY SYSTEM PROTECTION DURING CYBER THREATS

(71) Applicant: Schweitzer Engineering Laboratories, Inc., Pullman, WA (US)

(72) Inventors: Edmund O. Schweitzer, III, Pullman, WA (US); Krishnanjan Gubba Ravikumar, Pullman, WA (US); Austin Edward Wade, Moscow, ID (US); Tony J. Lee, Henderson, NV (US); David J. Casebolt, Moscow, ID (US); David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/832,816

(22) Filed: Mar. 27, 2020

(65) Prior Publication Data
US 2021/0014196 A1    Jan. 14, 2021

Related U.S. Application Data

(60) Provisional application No. 62/873,712, filed on Jul. 12, 2019.

(51) Int. Cl.
*H04L 29/06* (2006.01)
*G06F 21/55* (2013.01)
(Continued)

(52) U.S. Cl.
CPC .............. *H04L 63/02* (2013.01); *G06F 21/55* (2013.01); *G06F 21/70* (2013.01); *G06F 21/755* (2017.08);
(Continued)

(58) Field of Classification Search
CPC ......... H04L 9/002; H04L 9/003; H04L 63/02; H04L 29/06; G06F 21/70; G06F 21/75;
(Continued)

(56) References Cited

U.S. PATENT DOCUMENTS

| | | | |
|---|---|---|---|
| 6,396,279 B1 | 5/2002 | Gruenert |
| 6,608,493 B2 | 8/2003 | Hensler |

(Continued)

FOREIGN PATENT DOCUMENTS

| | | | |
|---|---|---|---|
| CN | 202455055 U | | 9/2012 |
| CN | 203287716 U | | 11/2013 |
| CN | 203287716 U | * | 11/2013 |

OTHER PUBLICATIONS

PCT/US2020/041185 Patent Cooperation Treaty, International Search Report and Written Opinion of the International Searching Authority, dated Oct. 6, 2020.

(Continued)

*Primary Examiner* — Jayesh M Jhaveri
(74) *Attorney, Agent, or Firm* — Gregory C. Baker (57) ABSTRACT

Systems and methods may maintain protection of electric power delivery systems in the event of an attack on protection and/or control features of the power system. Primary protective functions may be physically isolated from other functions in primary protection relays. Integrators may facilitate non-primary protection functions and disconnect all communication with primary protection relays in the event of an attack. Primary protection relays maintain protection functions even during the attack or unavailability of the integrators.

18 Claims, 6 Drawing Sheets

(51) Int. Cl.
*G06F 21/70* (2013.01)
*G06F 21/75* (2013.01)
*H02H 7/22* (2006.01)

(52) U.S. Cl.
CPC ............ *G06F 21/556* (2013.01); *G06F 21/75* (2013.01); *H02H 7/22* (2013.01)

(58) Field of Classification Search
CPC ........ G06F 21/755; G06F 21/50; G06F 21/55; G06F 21/556; H02H 7/22
See application file for complete search history.

(56) References Cited

U.S. PATENT DOCUMENTS

| | | |
|---|---|---|
| 6,795,789 B2 | 9/2004 | Vandiver |
| 6,847,297 B2 | 1/2005 | Lavoie |
| 6,892,115 B2 | 5/2005 | Berkcan |
| 6,892,145 B2 | 5/2005 | Topka |
| 6,909,942 B2 | 6/2005 | Andarawis |
| 6,985,784 B2 | 1/2006 | Vandevanter |
| 6,999,291 B2 | 2/2006 | Andarawis |
| 7,012,421 B2 | 3/2006 | Lavoie |
| 7,043,340 B2 | 5/2006 | Papallo |
| 7,058,481 B2 | 6/2006 | Jiang |
| 7,058,482 B2 | 6/2006 | Fletcher |
| 7,068,483 B2 | 6/2006 | Papallo |
| 7,068,612 B2 | 6/2006 | Berkcan |
| 7,111,195 B2 | 9/2006 | Berkcan |
| 7,117,105 B2 | 10/2006 | Premerlani |
| 7,151,329 B2 | 12/2006 | Andarawis |
| 7,254,001 B2 | 8/2007 | Papallo |
| 7,259,565 B2 | 8/2007 | Diercks |
| 7,262,943 B2 | 8/2007 | Stellato |
| 7,301,738 B2 | 11/2007 | Pearlman |
| 7,460,590 B2 | 12/2008 | Lee |
| 7,532,955 B2 | 5/2009 | Dougherty |
| 7,636,616 B2 | 12/2009 | Fletcher |
| 7,693,607 B2 | 4/2010 | Kasztenny |
| 7,747,354 B2 | 6/2010 | Papallo |
| 7,747,356 B2 | 6/2010 | Andarawis |
| 7,986,503 B2 | 7/2011 | Papallo |
| 8,024,494 B2 | 10/2011 | Soed |
| 8,213,144 B2 | 7/2012 | Papallo |
| 8,560,255 B2 | 10/2013 | Elwarry |
| 8,891,963 B2 | 11/2014 | Patel |
| 9,366,711 B2 | 6/2016 | Klapper |
| 9,632,147 B2 | 4/2017 | Hensler |
| 9,819,611 B2 | 11/2017 | Snowdon |
| 10,178,047 B2 | 1/2019 | Chapman |
| 10,379,991 B2 | 8/2019 | Yang |
| 2001/0056544 A1* | 12/2001 | Walker ...................... B60T 7/18 726/2 |
| 2003/0048508 A1 | 3/2003 | Yu |
| 2009/0012728 A1 | 1/2009 | Spanier |
| 2009/0296583 A1 | 12/2009 | Dolezilek |
| 2010/0040068 A1 | 2/2010 | Wimmer |
| 2010/0183298 A1 | 7/2010 | Biegert |
| 2012/0137356 A1* | 5/2012 | Kim ...................... H04L 63/105 726/11 |
| 2012/0249286 A1* | 10/2012 | Bush .................... H02H 1/0061 340/3.43 |
| 2016/0013632 A1 | 1/2016 | Lloyd |
| 2017/0026291 A1 | 1/2017 | Smith |
| 2017/0163029 A1* | 6/2017 | Hong ..................... H02H 7/263 |
| 2017/0288950 A1 | 10/2017 | Manson |
| 2018/0034689 A1 | 2/2018 | Kanabar |
| 2018/0089057 A1 | 3/2018 | Yang |
| 2018/0316719 A1 | 11/2018 | Schneider |
| 2018/0337767 A1* | 11/2018 | Harrison ................. H04L 9/003 |
| 2018/0348267 A1 | 12/2018 | Yang |
| 2020/0036748 A1* | 1/2020 | Tebekaemi .......... H04L 63/1441 |
| 2020/0125978 A1* | 4/2020 | Abbaszadeh .......... G06N 7/005 |

OTHER PUBLICATIONS

Xinshu Dong, et al., "Software-Defined Networking for Smark Grid Resilience: Opportunities and Challenges" Coordinated Science Laboratory, University of Illinois at Urbana-Champaign, Feb. 2015.
David Costello: Understanding and Analyzing Event Report Information, Oct. 2000.
Joe Perez: A Guide to Digital Fault Recording Event Analysis, 2010.
Considerations for Use of Disturbance Recorders; a Report to the System Protection Subcommittee of the Power System Relaying Committee of the IEEE Power Engineering Society, Dec. 27, 2006.
David Costello: Event Analysis Tutorial, Part 1: Problem Statements 2011.
Jane Starck, Antti Hakala-Ranta, Martin Stefanka, Switchgear Optimization Using IEC 61850-9-2 and Non-Conventional Measurements May 23, 2012.
Will Allen, Tony Lee: Flexible High-Speed Load Shedding Using a Crosspoint Switch Oct. 2005.
Qiaoyin Yang, Rhett Smith: Improve Protection Communications Network Reliability Throught Software-Defined Process Bus, Jan. 2018.
Caitlin Martin, Steven Chase, Thanh-Xuan Nguyen, Dereje Jada Hawaz, Jeff Pope, Casper Labuschagne: Bus Protection Considerations for Various Bus Types; Oct. 2013.

* cited by examiner

SECURE ELECTRIC POWER DELIVERY SYSTEM PROTECTION DURING CYBER THREATS

CROSS-REFERENCE TO RELATED APPLICATIONS

This application claims the benefit of the filing date of U.S. Provisional Patent Application Ser. No. 62/873,712, filed Jul. 12, 2019, for "Secure Electric Power Delivery System Protection During Cyber Threat," the disclosure of which is hereby incorporated herein in its entirety by this reference.

TECHNICAL FIELD

This disclosure relates to maintaining electric power delivery system protection even during a cyber threat. More particularly, this disclosure relates to disconnecting communications among power system protection devices while maintaining protective functions during a cyber threat.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are widely used to generate, transmit, and distribute electric power to loads, and serve as an important part of the critical infrastructure. Power systems and components are often monitored and protected by intelligent electronic devices (IEDs) and systems of IEDs that obtain electric power system information from the equipment and provide protective actions, monitor, and automate the power system. Several IEDs may be in communication to facilitate sharing of information for station-wide, area-wide, or even system-wide protection.

Due to the critical nature of electric power systems, attacks have been attempted on electric power systems using the communication system between IEDs. Several kinds of attacks have been observed including, for example: denial of service, man-in-the-middle, phishing, eavesdropping, manipulating controls, injecting commands, vulnerability exploitation, and the like. Attacks have been used to attempt disruption of power systems by disrupting communication between IEDs, taking control of supervisory control and data acquisition (SCADA) systems, manipulating industrial control systems, opening and closing switches and circuit breakers, and the like.

If an attack is not prevented, a bad actor may disrupt power delivery or even gain control over a power system. In the event of an attack, if communications between IEDs is disrupted (either purposefully or by the attacker), then the IEDs may not be able to provide adequate protection or monitoring of the power system.

Embodiments of the present disclosure include systems for electric power system protection that may protect the system and components thereof during a cyber-attack. For example, presented herein are several embodiments of systems and methods to provide reliable power system protection even during a cyber-attack by providing primary protection without reliance on communication. Further, some embodiments herein disclose disabling all communication to primary protection relays in the event of a detected or threatened attack.

Furthermore, it is recognized that modern electric power protection systems are integrated with automation, monitoring, and supervisory systems that may rely on digital communication. Embodiments of the present disclosure may provide a reliable electric power protection system that functions with automation, monitoring, and supervisory systems during normal operating conditions, and continues to provide protection to the power system even when such automation, monitoring, and supervisory systems are under attack or become unavailable. For example, described herein are electric power protection systems and primary protection devices that operate with automation, monitoring, and supervisory systems, but continue to provide reliable protection even when automation monitoring, and supervisory systems are under attack or otherwise unavailable. Such protection devices and systems may be segregated such that protection operations take place in primary protective equipment and do not rely on communication with automation, monitoring, or supervisory systems for primary protection operations.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules, subsystems, and/or components. As used herein, a software module or component may include any type of computer instruction or computer executable code located within a memory device and/or transmitted as electronic signals over a system bus or wired or wireless network. In addition, data being tied or rendered together in a database record may be resident in the same memory device, or across several memory devices, and may be linked together in fields of a record in a database across a network. Embodiments may be provided as a computer program product including a non-transitory computer and/or machine-readable medium having stored thereon instructions that may be used to program a computer (or other electronic device) to perform processes described herein.

Figure 1:
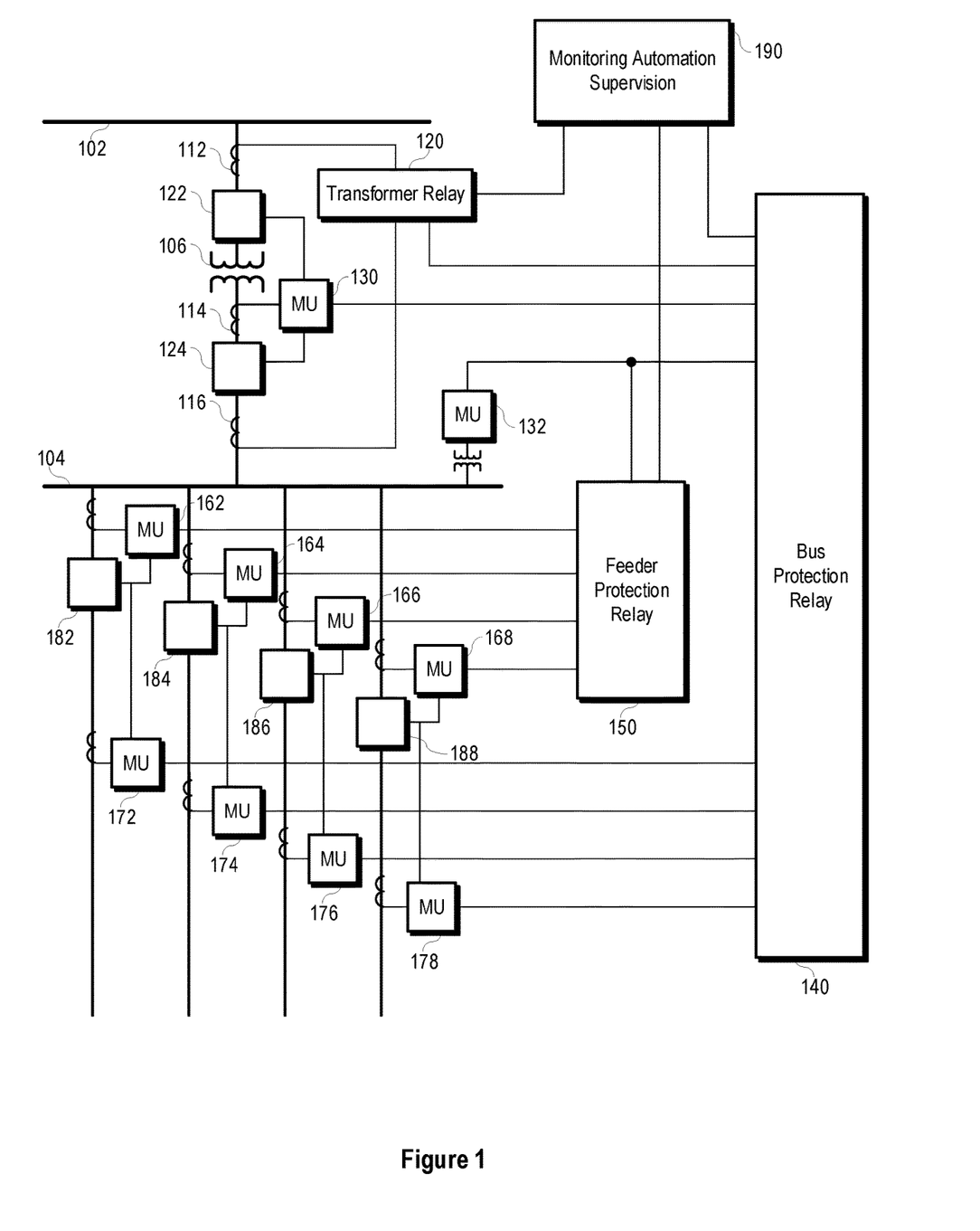
FIG. 1 illustrates a simplified one-line diagram of an electric power delivery system for providing electric power to loads including a system for protection and automation.

FIG. 1 illustrates a simplified one-line diagram of an electric power delivery system. It should be noted that the system may include multiple phases and additional equipment and complexity. Also illustrated is a system of IEDs that obtain electric power system information from merging units (MUs), and effect control actions on the electric power system using MUs to provide protection and automation to the electric power delivery system. The power system includes various equipment such as a bus 102 (illustrated as a transmission bus) providing electric power to a second bus 104 (illustrated as a distribution bus) via a transformer 106 for stepping down the power from a high (transmission) voltage to a lower (distribution) voltage. Various feeders extend from the second bus 104 for delivering electric power to distributed loads. Circuit breakers 122, 124, 182, 184, 186, 188 may be used to selectively connect and disconnect portions of the power system for various purposes such as reconfiguration, protection in the event of a fault, or the like.

A bus protection relay 140 may be an IED configured to determine operating conditions on a zone that includes the second bus 104 and provide signals to effect a protection operation upon determination of an adverse condition. IED 140 may obtain current signals related to electric power entering the bus 104 from MU 130, voltages from bus 104 using MU 132, and current signals related to electric power leaving bus 104 on the feeders from MUs 172, 174, 176, and 178. IED 140 may be configured to provide differential protection, overvoltage protection, and various other protection for zone including the bus 104.

Feeder protection relay may be an IED 150 that obtains bus voltage signals from MU 132 and current signals related to the feeders from MUs 162, 164, 166, and 168. IED 150 may provide overcurrent, directional, distance, overfrequency, underfrequency, and other protection to the feeders.

Transformer relay may be an IED 120 configured to provide protection to the transformer 106. IED 120 may obtain current signals from both sides of the transformer 106 from MUs or even directly from current transformers (CTs) 112 and 116. IED 120 may further provide information to IED 140. IED 120 may be configured to provide differential protection overcurrent protection, over frequency protection, underfrequency protection, and other various protection for the transformer 106.

MUs may be in communication with various circuit breakers 122, 124, 182, 184, 186, and 188 to provide signals to the circuit breakers and receive status information from the circuit breakers. Upon receiving an "open" signal from an IED, the MUs may be configured to signal related circuit breakers to open. For example, upon detection of an overcurrent condition on the first feeder, IED 150 may be configured to signal MU 162 to open breaker 182 to remove current from the faulted feeder.

In various embodiments, the IEDs may be in communication with a monitoring, automation, or other supervisory system or device 190, such as an integrator or a SCADA system. As mentioned above, a cyber-attack on the system may affect the bus protection relay 140, feeder protection relay 150, or transformer relay 120 via communications with such devices. The system may be attacked using the monitoring, automation, or other supervisory system 190 or any communication system to the IEDs 120, 140, 150. Such an attack could result in either control or disruption of the protection of the power system, as the IEDs 120, 140, and 150 are capable of controlling primary equipment such as the circuit breakers. Removing communications between IEDs 120, 140, 150 or between IEDs and the supervisory system 190, or even between the IEDs and the related MUs would interfere with the protection of the electric power system.

Figure 2:
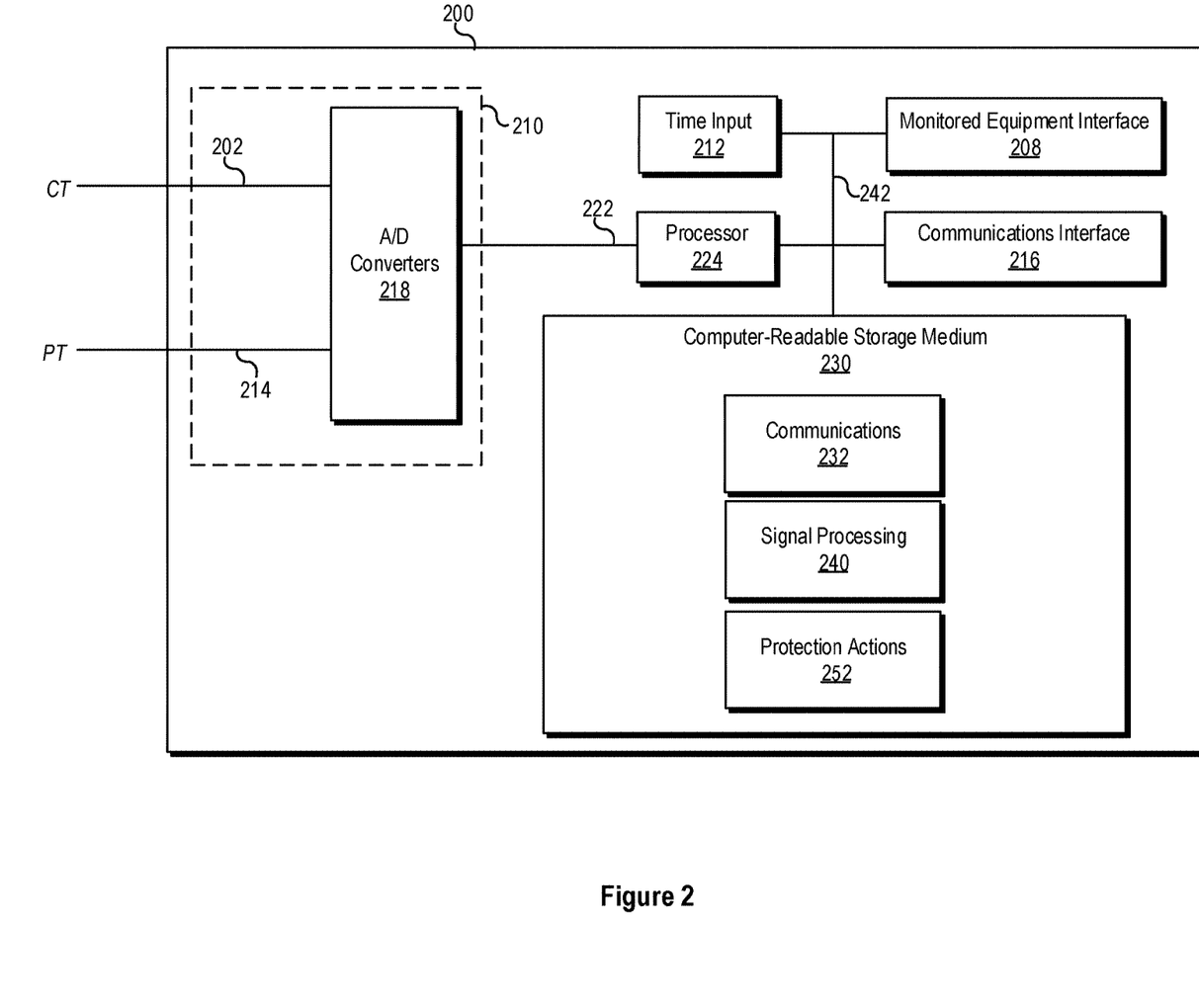
FIG. 2 illustrates a simplified block diagram of a typical intelligent electronic device (IED) used for electric power system protection.

FIG. 2 illustrates a simplified block diagram of an IED 200 such as the transformer relay 120, bus protection relay 140, or feeder protection relay 150. The IED 200 receives power system information such as currents and/or voltages from the power system. As illustrated, the IED 200 obtains analog current and voltage signals from CTs and potential transformers (PTs). In other embodiments, IED 200 may receive digitized analog signals from MUs. IED 200 may include sampling circuitry 210 including current input 202 and voltage input 214. Such inputs 202, 214 may include various transformers, filters, and other hardware to condition the analog signals for sampling and digitizing by one or more analog-to-digital converters ND 218. The digitized analog signals 222 may be provided to a processor 224.

IED 200 may include various inputs and interfaces such as a time input 212 to obtain a common time signal from a common time source. The common time signal may be used in various protection and monitoring functions. A communications interface 216 may be provided to facilitate communications with SCADA, other IEDs, MUs, or the like. A monitored equipment interface 208 may be in communication with monitored equipment such as circuit breakers, transformers, capacitor banks, voltage regulators, reclosers, MUs, or the like to send command signals to the equipment and/or receive status information from the equipment. A computer readable storage medium 230 may be a repository of computer instructions for execution on the processor 224. Although illustrated as a separate component, the storage medium 230 may be packaged with the processor 224. In various other embodiments, the processor may be embodied as a dedicated processing device such as a field-programmable gate array (FPGA) operating various protection instructions. Various components may be in communication via a communications bus 242.

The computer-readable storage medium 230 may include instructions for execution of various operations of the IED. For example, a module of communications instructions 232 may be executed by the processor such that the IED 200 performs communication functions with other devices. The communications instructions 232 may include instructions for formatting communications, receiving communications, addresses for communicating, settings related to compliance with IEC 61850 communications standards, and the like. Signal processing instructions 240 may include instructions for processing current, voltage, and other signals for use by other protection and monitoring functions. For example, signal processing 240 may include various digital filters, resampling, and the like. Protection actions instructions 252 may include instructions for performing various protection functions such as overcurrent, differential, directional, distance, undervoltage, voltage regulation, bus protection, overfrequency, underfrequency, traveling wave, and other protection operations.

It should be noted that typical IEDs perform many operations in addition to the primary protection operations required for safe and reliable operation of an electric power delivery system. In many installations, IEDs include orders of magnitude more lines of code dedicated to non-primary protection functions than to protection operations. For example, in a system of IEDs in communication under the IEC 61850 standard, each IED includes modules to execute communications and settings related to the communications to receive according with a Configured IED Description (CID) file.

Should such IEDs fall victim to cyberattack or suffer other failure, the primary protective functions of the device may be compromised. For example, if such an IED or system of devices undergoes a cyber-attack and is compromised, the attacker could take control of the IED and control primary equipment of the power system. Similarly, if an error occurs in one of the operations of the IED, it may perform a restart, during which time the protective functions of the IED are not operational. As the complexity of the functions (many of which are not directly responsible for protection) increases, the likelihood of error and need for restart also increases. Furthermore, it has been observed that the time for restart also increases as the complexity of the IED increases; thus, increasing the time that the IED does not perform protective functions during the restart.

In accordance with embodiments of the disclosure, primary protection operations are physically separated from various other functions performed by IEDs and supervisory systems. Communication between primary protection relays and supervisory devices is not needed for primary protection operations. In various embodiments, the protection system includes primary protection relays in communication with the electric power delivery system to obtain signals therefrom (either directly or using a merging unit) and effect primary protective actions by sending commands to primary equipment (either directly or using a merging unit). Further, the primary protection relays may communicate with various other devices such as integrators, automation systems, monitoring systems, supervisory (SCADA) systems and other IEDs. However, the primary protection relays may continue to provide monitoring and protection functions even if such communications becomes unavailable.

Figure 3:
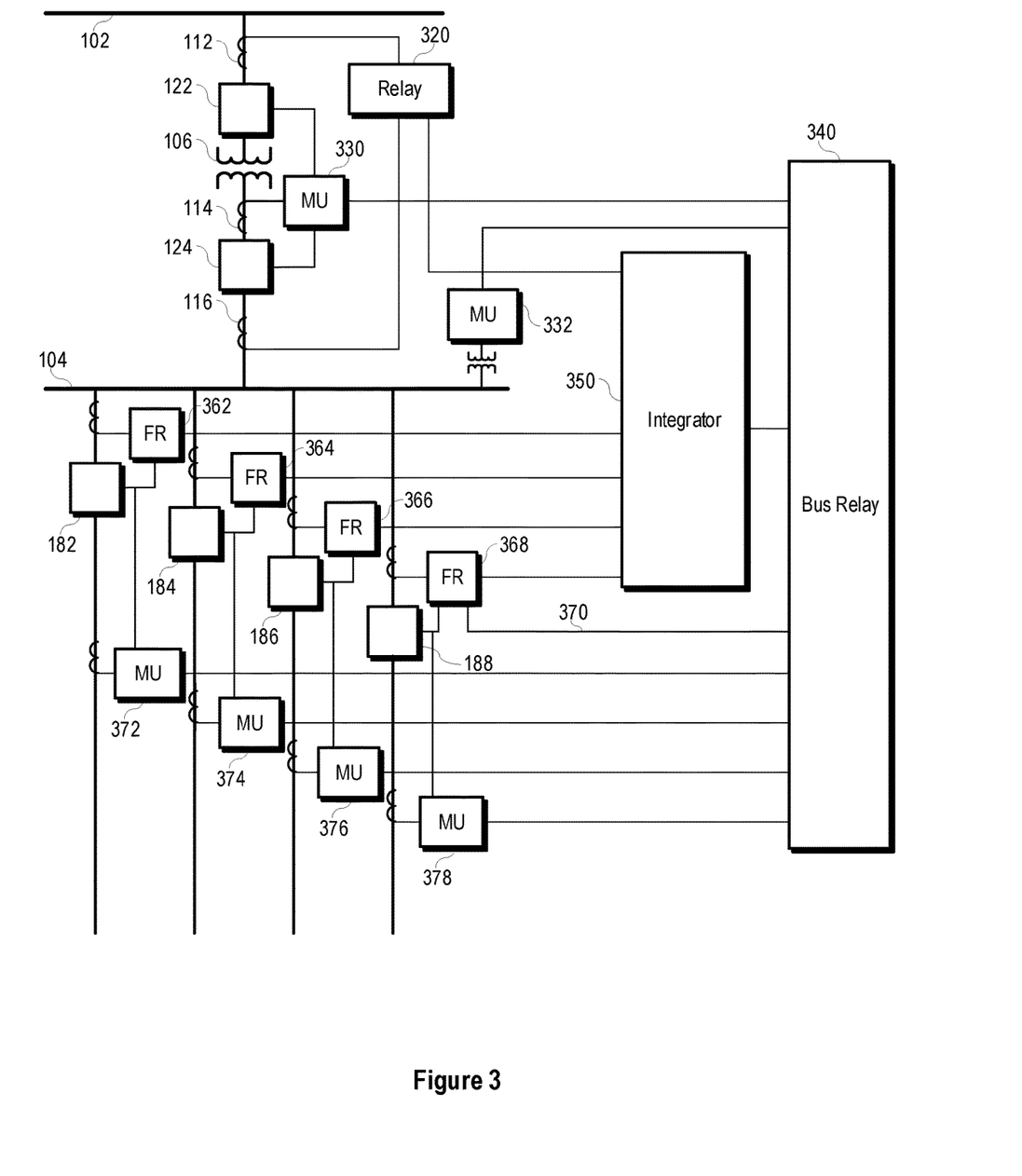
FIG. 3 illustrates a simplified one-line diagram of an electric power delivery system for providing electric power to loads including a resilient protection system in accordance with embodiments of the disclosure.

FIG. 3 illustrates a simplified one-line diagram of an electric power delivery system that may be similar to the system illustrated in FIG. 1, including a protection system in accordance with the present disclosure. In particular, the protection system includes various primary protection relays 320, 340, 362, 364, 366, 368, that do not depend on communication with an automation, monitoring, or supervisory system to continue providing reliable protection to the electric power delivery system equipment. Such primary protection relays may be used to separate primary protection functions from other functions traditionally performed by IEDs.

One or more of the primary protection relays may be a transformer relay 320 for providing protection to transformer 106. The transformer relay 320 may obtain current signals from CT 112 on the high voltage side of the transformer 106 and CT 116 on the low voltage side of the transformer 106. As illustrated, the transformer relay 320 may obtain current signals directly from CTs 112, 116. In various embodiments, the transformer relay 320 may obtain digitized analog signals from merging units in communication with CTs 112, 116 such as, for example, MU 330. In some embodiments, the transformer relay 320 may also obtain voltage signals from the high voltage and/or low voltage sides of the transformer 106 using PTs or merging units in communication with PTs.

The transformer relay 320 may determine protective actions using the current and/or voltage signals from high and/or low sides of the transformer 106. For example, the transformer relay 320 may determine overcurrent conditions on the high and/or low sides of the transformer 106; time-overcurrent conditions on the high and/or low sides of the transformer 106; current differential conditions through the transformer 106; neutral overcurrent conditions; restricted earth fault conditions; directional power conditions; and the like. In some embodiments, the transformer relay 320 may obtain temperature inputs from the transformer and determine temperature conditions of the transformer 106. More, different, or fewer protective elements may be performed by the transformer relay 320.

The transformer relay 320 may be in communication with one or more circuit breakers such as breakers 122 and 124. Such communication may be direct communication with the circuit breakers 122, 124 or via a merging unit such as MU 330. Upon detection of a condition outside of predetermined operating conditions, the transformer relay 320 may send an open or trip command to one or both circuit breakers 122, 124, thus effecting a trip protective action. Accordingly, the transformer relay 320 may provide protective functions to equipment of the electric power system.

Similarly, feeders from bus 104 may be protected using feeder relays 362, 364, 366, 368. Feeder relays 362-368 may obtain current signals from respective feeders using CTs and/or merging units such as MUs 372, 374, 376, 378. Feeder relays 362-368 may further obtain voltage signals from the bus using a PT and/or a merging unit such as MU 332. Using the current and/or voltage signals, the feeder relays 362-368 may determine operating conditions on the respective feeders including, for example: phase overcurrent; ground overcurrent; neutral overcurrent; negative sequence overcurrent; arc flash; overvoltage, undervoltage; directional power; overfrequency; underfrequency; rate-of-change-of-frequency; fault direction; fault distance; and the like. In the event of a condition determined outside of predetermined operating conditions, the feeder relay 362-368 may be configured to send an open or trip command to an associated circuit breaker, thus effecting a protective action on the electric power delivery system.

Feeder relays 362-368 may be in communication with respective circuit breakers 182, 184, 186, 188 as illustrated. In various embodiments, the feeder relays 362-368 may be in direct communication with the circuit breakers 182-188 as illustrated. In various other embodiments, the feeder relays 362-368 may be in communication with the circuit breakers 182-188 via merging units such as MUs 372-378. Accordingly, feeder relays 362-368 may provide protection to the feeders using measurements from the power system, using the measurements in one or more protective elements and effecting a protective action by commanding a circuit breaker to open.

The protective system may include an integrator 350 in communication with various devices and equipment in the electric power delivery system. Integrator 350 may be described as a supervisory device or system because it supervises and cooperates operation of other devices, such as relays 320, 362, 364, 356, and 358. The integrator 350 may perform monitoring, automation, supervisory, communication, backup protection, and other functions. As illustrated, the primary protection relays (such as, for example, the transformer relay 320 and the feeder relays 362-368) may be in communication with the integrator 350. According to various embodiments, the primary protection relays may transmit information to the integrator useful for its monitoring, automation, backup, supervisory, and other functions. The primary protection relays may transmit electric power delivery system measurements in accordance with a predetermined communication protocol. The primary protection relays may transmit indications of protective actions taken by the primary protection relays upon taking such protective actions. The primary protection relays may communicate calculations such as results of protection operations to the integrator 350. For example, a feeder relay 362 may detect a fault and calculate the magnitude of the fault. The feeder relay 362 may be configured to communicate to the integrator 350 the occurrence of the fault, a time, the distance to the fault, the current, and the protective action that was taken.

Furthermore, the primary protection relays may be configured to communicate to the integrator 350 when thresholds are crossed by power system conditions even if a protective action is not taken. For example, the transformer relay 320 may determine that a temperature of the transformer 106 is elevated above a high threshold, but has not yet reached a trip threshold. In such an instance, the transformer relay 320 may send the temperature information to the integrator 350.

The integrator 350 may be configured to communicate monitoring, automation, and supervisory information to the primary protection relays. For example, the integrator 350 may be configured to perform breaker failure analysis to determine if a breaker has operated after a signal has been sent to open the breaker. If the integrator 350 determines that the breaker has not opened, it may send a signal to the merging unit and/or to the primary protection relay to attempt to open the breaker. The integrator 350 may also signal a second breaker to open, where the second breaker is positioned to also remove power from the effected portion of the electric power delivery system. For example, upon failure of breaker 182, the integrator 350 may signal for breaker 122 or 124 to open, removing power from the bus 104 and related feeders.

The protection system may also include a primary protection relay in the form of a bus protection relay 340 configured to provide protective functions to the bus 104. Bus protection relay 340 may be a primary protection relay, as it is capable of obtaining power system measurements and providing protective functions without communication with any monitoring or other supervisory system. Bus protection relay 340 may obtain electric power system measurements related to electric power entering and leaving the protected bus 104 using CTs, PTs and the like and/or merging units. As illustrated, bus protection relay 340 obtains current measurement entering bus 104 from merging unit 330 which obtains current signals using CT 114. Voltage measurements may be obtained from merging unit 332 which obtains voltage signals from the bus 104 using a PT. Measurements of current leaving the bus 104 may be obtained from merging units 372, 374, 376, 378, which obtain current signals from the feeders using CTs. The bus protection relay 340 may use the currents and/or voltages to perform various protection functions such as, for example: overcurrent (phase, ground, neutral); breaker failure; time-overcurrent; current differential; undervoltage; overvoltage; and the like. The bus protection relay 340 may be configured to protect a zone of the electric power delivery system such as, for example, between circuit breaker 114 and breakers 182-188. The bus protection relay 340 may be configured to detect an event using the currents and/or voltages, and send a trip command to one or more circuit breakers to remove power from a portion of the power system affected by the event. For example, the bus protection relay 340 may determine that a fault is present on bus 104 using current differential protection principles, and command breaker 124 to open (either via direct communication or via merging unit 330) to remove electric power from the faulted bus 104. The bus protection relay 340 may further command breakers 182-188 to open (either via direct communication or via merging units 372-378) to limit potential backfeed from the feeders into the faulted bus 104.

Similar to the primary protection relays 320 and 362-368, the bus relay 340 is configured to continue providing protective functions to the power system regardless of availability of any integrator, monitoring, automation, or supervisory systems or devices. In various embodiments described herein, the primary protection relays 320, 340, 362-368 may be configured to primarily perform protective functions, with secondary functions being removed to a separate device such as the integrator 350. For example, calculating, time stamping, and time aligning synchrophasors may be unnecessary for protective functions, and thus removed to the integrator. Similarly, many communications functions such as formatting communications to correspond with supervisory protocols may be removed to the integrator.

Some primary protection functions may be performed by a combination of primary protection relays. For this, the system may include some communication between primary protection relays. As illustrated, a dedicated communication pathway 370 is configured between feeder relay 368 and bus relay 340. Although a single communication pathway between one feeder relay and the bus relay is illustrated, several primary protection relays may be in similar communication. The communication may be peer-to-peer, high speed, and operate on optical or electrical media. The communication may operate in accordance with the MirroredBits® protocol available from Schweitzer Engineering Laboratories, Inc. of Pullman, Wash. In some embodiments, the communication may facilitate primary protection functions such as, for example, transfer trip, blocking, interlocking, permissive schemes, direct control, relay-to-relay communications, or the like. In the illustrated example, the communication 370 may be useful for direct transfer tripping by the bus relay 340 in the event of breaker failure detection by the feeder relay 368. Thus, the bus relay may clear a fault by opening breaker 124 and/or 122 in the event that breaker 188 does not trip.

Figure 4:
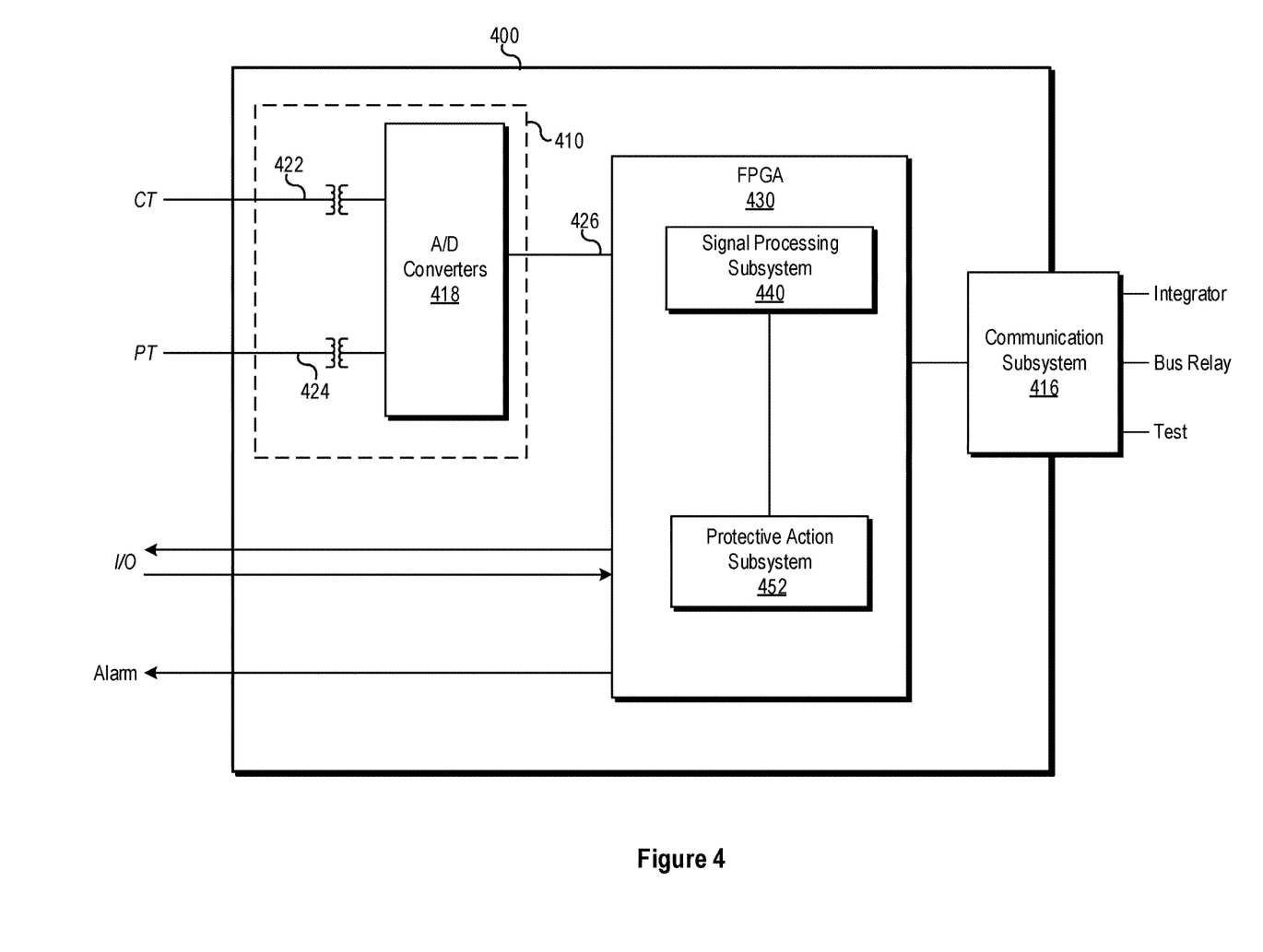
FIG. 4 illustrates a simplified block diagram of a primary protection device for maintaining protection of the electric power delivery system even during a cyber threat in accordance with embodiments of the disclosure.

FIG. 4 illustrates a simplified block diagram of a primary protection relay 400 in accordance with embodiments of the disclosure. The primary protection relay 400 may be configured as a transformer relay, bus relay, feeder relay, motor relay, generator relay, or the like. The primary protection relay 400 may be configured to perform dedicated protective functions available even without communication with any monitoring, automation, and/or supervisory system. As illustrated, the primary protection relay 400 may include a number of subsystems. For example, the primary protection relay 400 may include a signal input 410 for obtaining electric signals from the electric power delivery system either from primary equipment or from MUs. In the illustrated embodiment, current signals 422 may be obtained from an instrument transformer such as a CT; and voltage signals 424 may be obtained from an instrument transformer such as a PT. Various other equipment may be used to obtain currents and/or voltages. The current and voltage signals 422, 424 may be sampled and digitized by one or more analog-to-digital (A/D) converters 418. The signal input may include various other filters and the like to condition the signal for use by the protective functions. Although a single set of current and voltage signals are illustrated, the primary protection relay 400 may be configured to obtain multiple current signals and/or multiple voltage signals.

Furthermore, although the illustrated embodiment includes a primary protection relay 400 configured to obtain current and voltage signals directly using the signal processing 410, in some embodiments digitized current and/or voltage signals may be obtained using an MU. In such embodiments, the primary protection relay 400 may be configured with appropriate communication media for receiving digitized analog signals from one or more MUs. Further still, the primary protection relay 400 may be configured to provide a sample signal to the MU(s) to control sample timing.

The primary protection relay 400 may also include input/output for signaling to and receiving information from primary equipment. The input/output may be in direct communication with the primary equipment or may be in communication with a merging unit for transmitting commands to primary equipment and receiving information from primary equipment. For example, the primary equipment may be a circuit breaker or a recloser configured to open and/or close on command and provide a status signal indicating a state of open or closed. In other embodiments, the primary equipment may be a switch, voltage regulator, motor, generator (generator governor, inverter, or the like), capacitor bank, reactor, transformer, or the like, depending on the configuration of the primary protection relay 400.

The primary protection relay 400 may include an alarm output configured to provide an alarm signal upon occurrence of predetermined conditions such as taking a protective action, fault detection, or the like. The alarm signal may be provided as closing a contact output, a visual alarm, an audible alarm, a digital communication, or the like.

The primary protection relay 400 may also include one or more communications ports 416. In some embodiments, the communications ports 416 may be electrical. In various embodiments, the communications ports 416 may be optical to electrically isolate the primary protection relay 400 from the integrator, monitoring, automation, supervisory, or other systems and devices. The communications from communications ports 416 may be synchronous or asynchronous, and used for various predetermined purposes such as, for example, setting the primary protective device 400, communication with monitoring, automation, supervisory or other systems or devices, communication with one or more integrators, communication with one or more primary protection devices, testing, or the like.

The primary protection relay 400 may include a processing unit for executing the functions of the primary protection relay 400. As illustrated, the processing unit may be embodied as a field-programmable gate array (FPGA) 430 including instructions that when executed cause the primary protection relay 400 to perform functions in accordance with the instructions. A signal processing subsystem 440 may condition the digitized analog signals 426 into useful quantities for protection actions. For example, if the protective function includes an overcurrent element, the signal processing subsystem 440 may calculate current magnitudes for the protected phases. Similarly, a distance protection element may require a negative sequence of the electrical signal, and the signal processing subsystem 440 may be configured to calculate the negative sequence of the three-phase signal.

A protective action subsystem 452 may use signals from signal processing subsystem 440 to perform the selected protective functions. The available protective functions will depend on the settings and the type of primary protection relay 400. For example, if the primary protection relay 400 is a transformer relay, protective actions subsystem 452 may include: overcurrent elements (phase, high side, low side, neutral, ground); time overcurrent; current differential; restricted earth fault; directional power; and so forth. Settings may be applied to protective action subsystem 452 depending on the specific protected equipment and system. In operation, protective action subsystem 452 may execute the protective actions using the settings and the obtained electrical signals to determine a condition of the protected primary equipment or power system. Upon detection of predetermined conditions, the FPGA 430 sends a control signal to the protected equipment, such as a trip/open command to a circuit breaker. Furthermore, the FPGA 430 may operate instructions for communicating using port(s) 416 to signal to one or more integrators the power system conditions, actions taken, or the like. Even in the failure or unavailability of the communications 416, however, protective action subsystem 452 primary protection relay may maintain protection to the primary equipment and power system.

Figure 5:
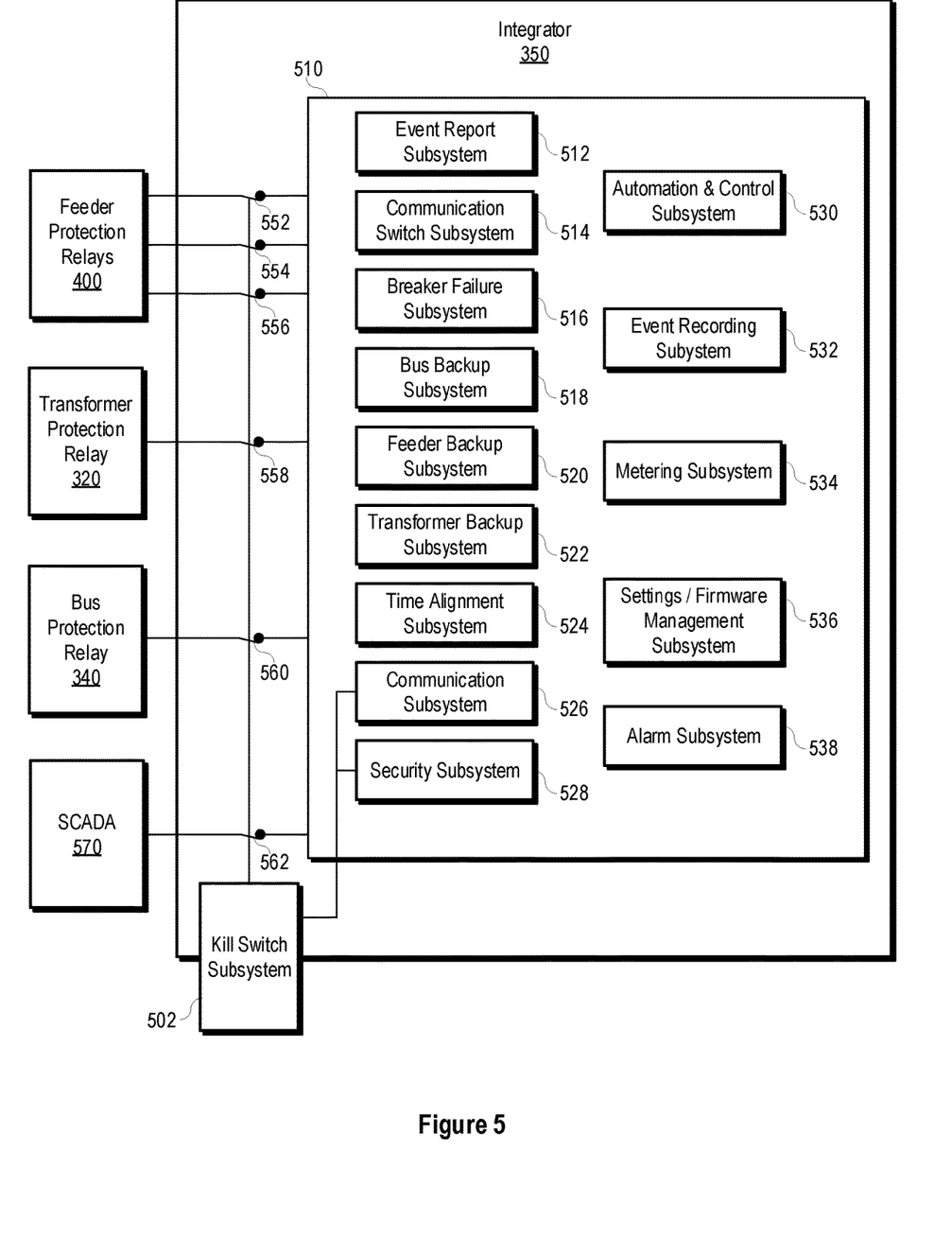
FIG. 5 illustrates a simplified block diagram of an integrator for protection and automation of an electric power delivery system in accordance with embodiments of the disclosure.

FIG. 5 illustrates a simplified block diagram of an integrator in accordance with some embodiments of this disclosure. An integrator may facilitate the physical separation of protection functions (performed by the primary protection relays) from non-protective functions (performed by the integrator). For example, the function of the integrator is to provide non-primary protective functions such as automation and backup protection for the power system, integration with other integrators, as well as communication with monitoring, automation, and supervisory systems. Certain functions previously performed by IEDs protecting electric power systems, which are not directly required for primary protection, may be removed from the primary protective devices and performed by an integrator 350 in accordance with the present disclosure. Each integrator may be in communication with one or more primary protective devices, one or more other integrators, as well as other monitoring, automation, and supervisory systems.

As discussed above, the primary protective devices are configured to continue to provide protective functions to the electric power delivery system even when the integrator or other monitoring, automation, and/or supervisory systems and devices are unavailable. Thus, protection of the electric power delivery system may continue through times of disruption or unavailability of the integrator (e.g., during testing procedures, restart, upgrade, settings changes, hardware malfunction, software error, bit flip errors, physical attack, cyber-attack, or the like). The integrator may be configured to stop its communication with primary protective devices in the event of a disruption or period of unavailability of the integrator so that such integrator disruption or unavailability cannot affect the protective functions of the primary protective devices.

As illustrated in FIG. 5, the integrator 350 may include a number of subsystems. For example, the integrator 350 may include a processing device 510 for executing instructions related to such functions. The processing device 510 may comprise any processor capable of executing computer instructions including, for example, a computer processor, a microprocessor, an FPGA, or the like, and may be packaged with or be in communication with computer memory for storing computer instructions to be executed by the processing device 510. Processing device 510 may further comprise non-transitory computer readable memory to store instructions and other information. Such instructions when executed by the processing device 510 performed by the integrator may enable a variety of functions.

In the illustrated embodiment, integrator 350 includes a variety of subsystems to perform various functions, including an event report subsystem 512, a communication switch subsystem 514, a breaker failure subsystem 516, a bus backup protection subsystem 518, a feeder backup protection subsystem 520, a transformer backup protection subsystem 522, a time alignment subsystem 524, communication subsystem 526, a security subsystem 528, and the like. Additional functions that may be performed by the integrator 350, such as an automation and control subsystem 530. An event recording subsystem 532 may record power system conditions, time, and actions taken are recorded for later retrieval, and/or transmission using the event report subsystem 512. The integrator 350 may enable metering operations subsystem 534. The integrator may maintain current records of settings and firmware versions for each of the connected primary relays. Settings and/or firmware management subsystem 536 may be used to update settings on primary relays or the integrator 350 and update firmware of primary relays or the integrator 350.

The integrator 350 may be in communication with, and even facilitate communication among several different devices and systems including, for example: one or more feeder protection relays 400 (such as feeder protection relays 362, 364, 366, 368); transformer protection relay 320; bus protection relay 340. Other types of relays (e.g., motor relays, generator relays; and the like) may be incorporated in other embodiments. The integrator 350 may be in communication with other supervisory systems such as, for example, SCADA 570. In other embodiments, the integrator 350 may also be in communication with other integrators. As suggested above, the integrator 350 may perform communication functions and may function as a communication switch among the various connected devices.

The integrator 350 may include one or more disconnect switches 552, 554, 556, 558, 560, 562 for selectively making and breaking communication paths with the various connected devices. Any configuration of switches capable of selectively breaking the communication pathways to the various device may be used. The switches 552-562 may be in the form of electromagnetic relays capable of rapid disconnection. The switches 552-562 may be optical switches when communication with the devices uses optical media. In any case, the switches 552-562 may be configured to disconnect communication between the various devices and the integrator 350.

The switches 552-562 may be operated by a kill switch 502 or may be operated individually (e.g., as one or more individual communication kill switches). For example, when activated, the kill switch 502 may signal the switches to open (e.g., an electrical signal to a relay, an electrical signal to an optical switch, a physical action on physical contacts, or the like), thus disconnecting communications between the integrator and the various devices, including the primary protection relays. The kill switch 502 may be operated by various actions. In one embodiment, the integrator 350 includes a dedicated physical input (e.g., pushbutton, membrane button, switch, or the like) that may be activated by a human operator to activate the kill switch 502. Accordingly, an operator may activate the kill switch 502 using the physical input to immediately open the switches, disrupting communications between the integrator 350 and connected devices. The physical input may be situated on a front panel of the integrator 350, near a human-machine interface of the integrator 350, or on other such face of the integrator 350 so as to be accessible by an operator.

In various embodiments, the integrator 350 may include contact inputs in communication with the kill switch 502 such that the kill switch may be activated remotely by the contact input. That is, a control voltage input to the contact input may activate the kill switch 502 to open the communication switches, disrupting communications between the integrator 350 and the connected devices. The contact input may be activated by any process as determined by the system designer. For example, the contact input may be activated by an external device. The external device may be configured to detect an anomaly such as a cyber intrusion, physical intrusion, security condition, or the like. The contact input may be activated by a firewall. The contact input may be activated remotely. The contact input may be activated using a SCADA system. The contact input may be activated using a dedicated communication line. In various embodiments, the contact input may be activated by a physical intrusion detector such as a light sensor (activated by light upon opening of a door), a microphone (activated by unexpected sound), an accelerometer (activated by unexpected movement), a security alarm system, or the like.

In various embodiments, the kill switch 502 may be activated by an internal security subsystem 528 operating on the integrator 350. The security subsystem 528 may be configured to detect a security condition such as a cyber-attack, and signal the kill switch to immediately open the switches to disrupt communication with the connected devices. The security function 528 may monitor communications and signal the kill switch 502 to open upon detection of communications anomalies such as heightened traffic (e.g., denial of service attack); communications originating from unknown sources; communications from devices or sources not on an established whitelist; communications levels outside of a baseline; or the like. Accordingly, the integrator may detect an unsecure condition and signal the kill switch 502 to immediately open the switches, disrupting communication with the various connected devices.

In some embodiments, the kill switch 502 may be operated by remote communications using the communication subsystem 526. In various systems, devices (e.g., IEDs and integrators) may communicate in accordance with predetermined protocols. Commands may be sent to particular devices using such established communications protocols. For example, the system may operate in accordance with the IED 61850 protocol, wherein the integrator executes the communication subsystem 526 to receive, parse, format, and send communications in accordance with the standard. Accordingly, a command may be sent remotely using the established communication media and protocol used by the integrator to command the kill switch 502 to immediately open the switches and disrupt communication to the connected devices.

Upon activation of the kill switch 502, the integrator 350 may issue an alarm signal using an alarm subsystem 538. The alarm signal may be displayed using an alarm indication of the integrator 350. The alarm signal may be transmitted to other devices or supervisory systems using contact outputs. The alarm signal may be transmitted on SCADA or otherwise on the communications media just before the kill switch 502 opens the switches. In some embodiments, the kill switch 502 may not disconnect the communication with SCADA or select other devices or systems. In such an embodiment, the integrator 350 may communicate the alarm to SCADA or the select other devices or systems. The alarm signal may be useful for operators to be alerted that an anomaly has occurred and, although the power system remains protected using the primary protection devices, the integrator has interrupted communications with the primary protection devices, and some functions may be offline.

As indicated above, electric power delivery systems have become targets for criminals attempting to interrupt electric power delivery or even disable primary equipment. Such attacks may take place using established communication networks that facilitate communication among IEDs in an electric power delivery system. The integrator 350 including a kill switch 502 as described herein effectively isolates primary protective devices from any communication networks upon detection of a threat, such that criminals cannot access, operate, disable, or otherwise tamper with electric power system protection, or use protective devices to operate or attack primary equipment.

It should be noted that a system designer may balance dependability and security of the protection systems described herein by increasing or decreasing a sensitivity of threat detection. Nevertheless, even in systems where dependability is favored (increased sensitivity to threat detection) and the kill switch may be operated in absence of a threat, the protection of the electric power delivery system remains operational. That is, the costs of incorrect operation of the kill switch to the protection of the power system are minimal due to the isolation of primary protective devices disclosed herein.

In one embodiment, the kill switch 502 and the associated disconnection switches 552-562 may be disposed in a device separate from the integrator. The kill switch and associated disconnection switches may be installed between the devices (e.g., primary protection devices) and the integrator 350. In various instances, the one or more communicated disruption switches (e.g., the kill switch 502 and associated disconnection switches 552-562) may be disposed in a communication switch or communication switching subsystem (e.g., communications switching 514).

Figure 6:
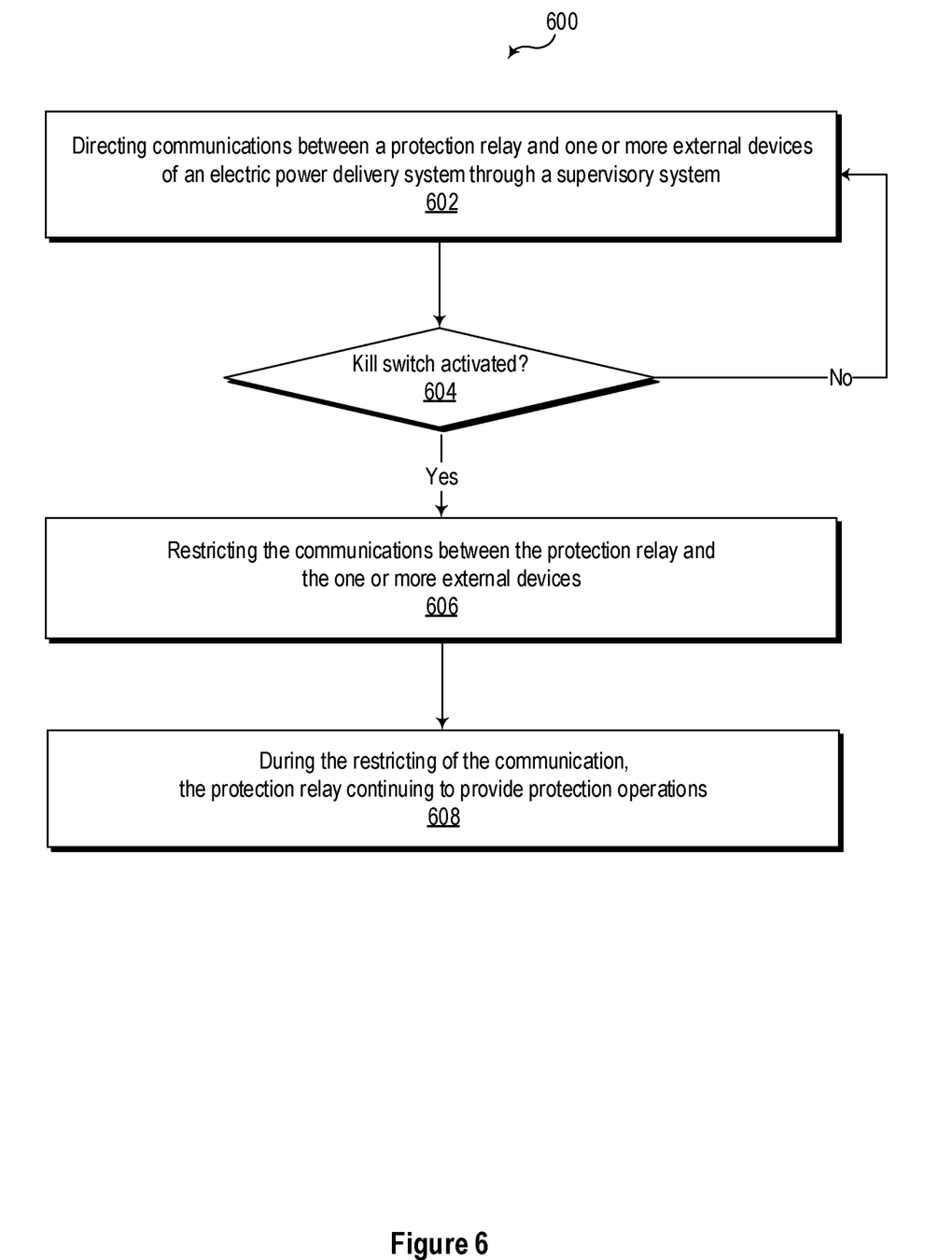
FIG. 6 illustrates a flow chart of a method of facilitating protection of an electric power delivery system during a cyber-attack consistent with embodiments of the present disclosure.

FIG. 6 illustrates a flow chart of a method 600 of facilitating protection of an electric power delivery system, for example, during a cyber-attack. At 602, communications between a protection relay of the electric power delivery system and one or more external devices in communication with the electric power delivery system (e.g., in communication with the protective relay) are directed through an integrator. In some embodiments, the system, protective relay, and supervisory system may be embodied as those discussed above, for example, as discussed in reference to FIG. 1 through FIG. 5.

At 604, it may be determined whether a kill switch has been activated. If the kill switch has not been activated, communications may continue to be directed between the protection relay and external devices through the supervisory system.

At 606, the communications between the protective relay and the one or more external devices may be restricted with the supervisory system. For example, an integrator may restrict incoming communications from the one or more external devices in communication with the integrator and the protection relay in order to restrict access (e.g., control of) to the protective relay. In some embodiments, a kill switch (e.g., logical and/or physical) may be used to restrict the communications between the protective relay and the one or more external devices. The kill switch may automatically engage in response to one or more detected threats to the electric power delivery system.

At 608, during the restricting of the communication, one or more protection operations of the protection relay may continue to be enabled (e.g., maintained). For example, the protective devices may continue to provide protective functions to the electric power delivery system even when communications from and/or between the integrator or other monitoring, automation, and/or supervisory systems and devices are unavailable.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present disclosure should, therefore, be determined only by the following claims.

What is claimed is:

1. A system to maintain protection of an electric power delivery system during a cyber-attack, comprising:
a primary protection relay configured to provide protection to the electric power system, the primary protection relay comprising:
a power system signal input configured to receive electric power delivery system signals from one or more external elements of the electric power delivery system;
a protection subsystem configured to determine an operating condition of the electric power delivery system using the electric power delivery system signals and to implement a protective action command when the operating condition is outside of a predetermined operating parameter; and
a protective action output configured to transmit a protective action command to be performed by primary equipment of the electric power delivery system; and
a supervisory system in communication with the primary protection relay, the supervisory system comprising:
a communication subsystem configured to control communications with the primary protection relay, the communications being distinct from the electric power delivery system signals received from one or more external elements of the electric power delivery system via the power system signal input; and
a kill switch subsystem configured, upon activation following detection of the cyber-attack, to restrict all of the communications with the primary protection relay received via the communication subsystem;
wherein, after activation of the kill switch subsystem and while all of the communications with the primary protection relay continue to be restricted, the primary protection relay continues to provide protection of the electric power delivery system by continuing to receive and monitor the electric power delivery system signals from the one or more external elements of the electric power delivery system during the restriction of all of the communications via the communication subsystem.

2. The system of claim 1, wherein the supervisory system further comprises a contact input for activation of the kill switch subsystem.

3. The system of claim 1, wherein the supervisory system comprises an integrator.

4. The system of claim 1, wherein the supervisory system further comprises a security subsystem in communication with the kill switch subsystem, the security subsystem to detect an attack and activate the kill switch subsystem upon detection of the attack.

5. The system of claim 4, wherein the security subsystem further comprises a firewall enabled by one of activation of the kill switch subsystem or detection of a cyber threat.

6. The system of claim 1, wherein the communication subsystem is in communication with the kill switch subsystem and operable to receive of a command to activate the kill switch subsystem.

7. The system of claim 1, wherein the supervisory system comprises a physical input in communication with the kill switch subsystem to activate the kill switch subsystem.

8. The system of claim 7, wherein the physical input comprises at least one of a pushbutton, a membrane button, or a physical switch.

9. The system of claim 7, wherein the physical input is disposed on an accessible face of the primary protection relay.

10. The system of claim 1, wherein the kill switch subsystem comprises a plurality of communication disconnect switches, each of the plurality of communication disconnect switches to restrict one or more communication paths between the primary protection relay and one or more external elements.

11. The system of claim 1, wherein the primary protection relay comprises one of a transformer relay, a bus relay, or a feeder relay.

12. The system of claim 1, wherein the protection subsystem comprises at least one of an overcurrent element, a differential element, an overvoltage element, an undervoltage element, a directional element, a distance element, an overfrequency element, an underfrequency element, or a rate-of-change-of-frequency element.

13. The system of claim 1, wherein the communication subsystem comprises an optical communication port.

14. A method for selectively disabling at least one communication path to a primary protection relay while the primary protection relay continues to provide protection to an electric power delivery system using a supervisory system, the method comprising:
directing, with a supervisory system, communications between a primary protection relay of the electric power delivery system and one or more external devices in communication with the electric power delivery system through the supervisory system, the primary protection relay configured to:
receive electric power delivery system signals from the one or more external elements of the electric power delivery system;
determine an operating condition of the electric power delivery system using the electric power delivery system signals and to implement a protective action command when the operating condition is outside of a predetermined operating parameter; and
transmit a protective action command to be performed by primary equipment of the electric power delivery system;
detecting, with the supervisory system, activation of a kill switch;
disrupting, with the supervisory system, one or more communication paths between the primary protection relay and the one or more external devices while the kill switch is activated, the one or more communication paths being distinct from the electric power delivery system signals received from one or more external elements of the electric power delivery system by the primary protection relay; and
during the disrupting of the communication path, continuing,
with the primary protection relay, to provide protection operations by continuing to receive and monitor the electric power delivery system signals from the one or more external elements of the electric power delivery system during the disrupting of the one or more communication paths.

15. The method of claim 14, wherein the supervisory system comprises an integrator.

16. The method of claim 15, further comprising automatically activating the kill switch in response to one or more detected threats to the electric power delivery system.

17. The method of claim 15, wherein activating the kill switch comprises detecting manipulation of a physical switch by a user.

18. The method of claim 14, further comprising activating at least one of a plurality of communication disconnect switches, each of the communication disconnect switches restricting one or more select communication paths between the primary protection relay and the one or more external devices.

* * * * *